US012357520B2

(12) United States Patent
Gallingani

(10) Patent No.: US 12,357,520 B2
(45) Date of Patent: Jul. 15, 2025

(54) SWIMMING POOL LIFT WITH WEATHER PROTECTION FOR PERMANENT INSTALLATION AT AN EDGE OF A SWIMMING POOL

(71) Applicant: Autolift S.r.l., Mantova (IT)

(72) Inventor: Marco Gallingani, Reggio Emilia (IT)

(73) Assignee: Autolift S.r.l., Mantova (IT)

( * ) Notice: Subject to any disclaimer, the term of this patent is extended or adjusted under 35 U.S.C. 154(b) by 258 days.

(21) Appl. No.: 17/988,872

(22) Filed: Nov. 17, 2022

(65) Prior Publication Data

US 2024/0164965 A1 May 23, 2024

(51) Int. Cl.
*A61G 7/10* (2006.01)

(52) U.S. Cl.
CPC ......... *A61G 7/1005* (2013.01); *A61G 7/1044* (2013.01); *A61G 7/1059* (2013.01)

(58) Field of Classification Search
CPC .................................................... A61G 7/1005
USPC .............................................................. 4/496
See application file for complete search history.

(56) References Cited

U.S. PATENT DOCUMENTS 4,183,106 A * 1/1980 Grimes ................ A61G 7/1005 187/901
5,218,727 A 6/1993 Krumbeck
5,790,995 A * 8/1998 Caden .................. A61G 7/1059 4/491
5,960,909 A * 10/1999 Horcher ............... A61G 7/1019 187/200
6,129,850 A * 10/2000 Martin ...................... C02F 1/78 210/765
8,646,119 B1 * 2/2014 Sheridan .............. A61G 7/1005 4/561.1

FOREIGN PATENT DOCUMENTS

| | | | |
|---|---|---|---|
| BR | 202019025852 | U2 | 6/2021 |
| FR | 2 555 045 | A | 5/1985 |
| GB | 2 191 989 | A | 12/1987 |

OTHER PUBLICATIONS

Extended European Search Report of European Application No. 23 21 0361 Dated Apr. 11, 2024.

* cited by examiner

*Primary Examiner* — Lauren A Crane
(74) *Attorney, Agent, or Firm* — Collard & Roe, P.C.

(57) ABSTRACT

A swimming pool lift with weather protection for permanent installation at an edge of a swimming pool includes a seat for supporting a disabled person, a linkage assembly to move the seat between an entry level position and a water level position, and a driving device to move the linkage assembly. The linkage assembly is configured to be moved by the driving device between a folded state, in which the seat is positioned at the entry level position, and an unfolded state, in which the seat is positioned at the water level position. The swimming pool lift further includes a casing being configured to house the linkage assembly and the driving device, when the linkage assembly is in the folded state.

14 Claims, 15 Drawing Sheets

SWIMMING POOL LIFT WITH WEATHER PROTECTION FOR PERMANENT INSTALLATION AT AN EDGE OF A SWIMMING POOL

BACKGROUND OF THE INVENTION

1. Field of the Invention

The disclosure relates to a swimming pool lift for permanent installation at an edge of a swimming pool with protection against weather conditions.

2. Description of the Related Art

A swimming pool lift enables disabled persons to enter a pool. The lift usually has a seat that is attached to a linkage assembly. The linkage assembly is moved by a driving device and can thus lower the seat into the water from a position outside the pool.

Swimming pool lifts are available as mobile lifts and fixed lifts that are permanently installed at a pool edge. Mobile lifts can be moved to the pool side as needed. These lifts are often used outdoors, for example in outdoor pools, as they can be stored in storage rooms when it rains or during the winter season. Compared to fixed pool lifts, however, mobile lifts are very expensive and difficult to move because of their weight. It would therefore be easier and cheaper to install a fixed lift.

Unfortunately, a fixed swimming pool lift quickly becomes defective, especially when installed outdoors, as the electric components as well as the mechanical parts can be damaged outdoors by the effects of the weather, for example rain and moisture at night. For this reason, fixed swimming pool lifts are almost exclusively used in indoor pools. However, even with indoor pools there is the disadvantage that people, such as playing children, can injure themselves on sharp corners and edges of the swimming pool lift.

There is a need to provide a swimming pool lift that can be permanently installed at an edge of a swimming pool and that is protected from weather conditions.

SUMMARY OF THE INVENTION

A swimming pool lift with weather protection for permanent installation at an edge of a swimming pool is specified according to the invention.

According to an embodiment, the swimming pool lift for permanent installation at the edge of a swimming pool comprises a seat for supporting a disabled person. The swimming pool lift further comprises a linkage assembly to move the seat between an entry level position and a water level position, a driving device to move the linkage assembly, and a casing. The linkage assembly is configured to be moved by the driving device between a folded state, in which the seat is positioned at the entry level position, and an unfolded state, in which the seat is positioned at the water level position. The casing is configured to house the linkage assembly and the driving device, when the linkage assembly is in the folded state.

The casing allows the swimming pool lift to be protected from adverse weather conditions, such as rain, sun, storm etc., and from harmful environmental influences, for example salt or chloramine, so that the functionality of the swimming pool lift is maintained over a long period of time, even if the lift is installed in the outdoor area of a swimming pool. In particular, the linkage assembly, which is usually freely accessible and thus visible in a fixed swimming pool lift that is permanently installed at the pool edge, has sharp corners and edges. Since the linkage assembly is now completely located inside the casing, the risk of injury at the sharp-edged parts of the swimming pool lift is eliminated. In addition, the casing optimizes the design of the swimming pool lift. The swimming pool lift looks more valuable and modern, and also not disturbing than a lift where the driving device, for example an electrical motor or a hydraulic system operated with oil pressure or water pressure, and all mechanical parts are visible for the pool visitors.

In the following, advantageous embodiments of the swimming pool lift with weather protection for permanent installation at an edge of a swimming pool are described in general.

According to a possible embodiment of the swimming pool lift, the casing comprises a cover, a first sidewall and a second sidewall opposite to the first sidewall, as well as a front end face and a rear end face opposite to the front end face. Especially the sidewalls of the swimming pool lift can be advantageously used for information or advertising purposes. Information or advertising posters can be glued or otherwise attached to the flat, large side surfaces of the lift. Moreover, on the side surfaces, or at least on one of the side surfaces, a holder for inserting posters can be attached, for example.

Furthermore, according to a possible embodiment, an electronic display may be attached to the side surface of the casing. The electronic display may be waterproof. The electronic display can be used to show information that the pool operator wants to provide to the pool guests or to display advertisements. The electronic display may be powered by a battery of the swimming pool lift, which usually powers an electric motor of the lift.

According to a possible embodiment of the swimming pool lift with weather protection, the casing is formed with rounded transition sections between the cover and the first and second sidewall, and with rounded transition sections between the cover and the rear and the front end face, and with rounded transition sections between the rear end face and the first and second side face, and with rounded transitions between the front end face and the first and second sidewall. This configuration enables the housing to have no sharp edges. This means that there is no risk of injury to visitors to the swimming pool, users of the swimming pool lift or maintenance personnel. Furthermore, the casing is easy to clean, because water can run off the casing and residues of water or cleaning agents cannot accumulate in grooves of the casing.

According to a possible embodiment of the swimming pool lift, a portion of the casing may be formed from a transparent material. This allows service personnel to take a quick look inside the casing, especially at the mechanical structures, for example the linkage assembly, or the electrical components, for example an electric motor, to quickly detect a defect without opening or removing the casing.

According to another possible embodiment of the swimming pool lift, the lift may comprise a wall part which is formed as an openable flap. The flap may be movably attached to the casing via a hinge. The flap can be attached to a point on the casing wall between which fault-prone parts of the lift's mechanics are concealed, or behind which electrical components of the lift are located.

According to an advantageous embodiment, the swimming pool lift comprises a supporting rack. The casing is mounted on the supporting rack. The supporting rack can be made of metal to which the casing is attached. This makes the casing stable, which is particularly advantageous if the casing is made of plastic.

According to a possible embodiment, the swimming pool lift may comprise a baseplate for installation of the swimming pool lift on a ground, for example on the edge of the pool. The swimming pool lift may further comprise a supporting frame for supporting the linkage assembly and the supporting rack. The supporting frame may be attached to the baseplate. The linkage assembly and the supporting rack may be mounted to the supporting frame. The supporting frame, which is usually used for supporting the linkage assembly, is thus also used for stably attaching the supporting rack.

According to a possible embodiment of the swimming pool lift, the supporting rack may comprise a support bar having a first portion, a second portion and a third portion. The first portion of the support bar may be fixed to the supporting frame. The second portion of the support bar extends from an end of the first portion of the support bar angled to the first portion of the support bar towards the cover of the casing. The third portion of the support bar extends from an end of the second portion of the support bar angled to the second portion of the support bar towards the front end face of the casing.

According to a possible embodiment of the swimming pool lift, the driving device is power-supplied by a battery pack. The battery pack may be mounted to the second portion of the support bar. The battery pack can thus be mounted at a high point above the baseplate and is thus housed in the casing or at least arranged in a splash-proof manner above the ground.

According to a possible embodiment of the swimming pool lift, the rear end face of the casing has a recess. The linkage assembly is arranged inside the casing so that the battery pack is located in the recess of the rear end face of the casing, when the linkage assembly is in the folded state. The battery is thus easily accessible for maintenance work without the casing having to be removed. In particular, the battery pack can be easily replaced or charged.

According to a possible embodiment of the swimming pool lift, the casing may comprise several individual parts which are attached to the supporting rack. The individual parts of the casing can be mounted to the supporting rack, for example by quick-release fasteners or by screws or other fastening devices. This makes it possible to quickly demount individual parts of the housing. To carry out maintenance on the mechanical parts or the electrical components of the lift, only one housing part needs to be demounted from the supporting rack for example.

According to a possible embodiment of the swimming pool lift, a sealing element may be provided between the individual parts of the casing. This prevents, for example, water or solid particles such as sand, from entering the interior of the casing.

According to a possible embodiment, the swimming pool lift comprises a supporting arm to support the seat. The linkage assembly may comprise at least a lifting arm. The supporting arm may be pivotably coupled to the lifting arm. The front end face of the casing has an opening. The linkage assembly is arranged inside the casing so that at least a portion of the lifting arm, at which the supporting arm is pivotably mounted, is moved outside the casing, when the linkage assembly is moved from the folded state to the unfolded state.

In this embodiment of the swimming pool lift, the essential mechanical parts, such as the linkage assembly, and the essential electrical components, such as an electric motor, are in a protected state when the swimming pool lift is in the entry level position and the linkage assembly is retracted. Part of the linkage assembly comes out of the casing, for example the lifting arm, only when the seat is lowered, i.e. when the swimming pool lift is moved to the water level position.

According to another possible embodiment of the swimming pool lift, the casing is configured to be open when the linkage assembly is moved from the folded state to the unfolded state. This still ensures that the mechanical parts and the electrical components of the lift are protected from bad weather conditions when the swimming pool lift is not in use.

According to a possible embodiment of the swimming pool lift having a casing which is opened when the lift is in operation, the casing comprises at least a first part forming the rear end face and a first portion of the first and second sidewall of the casing. The casing comprises at least a second part forming the front end face and a second portion of the first and second sidewall of the casing. The at least first part of the casing is fixed to the supporting rack. The at least second part of the casing is fixed to the linkage assembly so that the casing is opened, when the at least first and second part of the casing are moved apart, and the linkage assembly is moved from the folded state to the unfolded state.

Embodiments of a casing for housing a swimming pool lift are specified below.

A casing for housing a swimming pool lift is made from a water-resistant material being configured to give the casing a solid shape. The casing is embodied to be attached to the swimming pool lift to cover mechanical parts and electrical components of the swimming pool lift and to provide weather protection for the mechanical parts and electrical components of the swimming pool lift.

The casing may be made from a plastic material. While a tarpaulin has to be put over the lift at night and the lift has to be uncovered again in the morning or when needed, the swimming pool lift with fixed housing is permanently ready for use and still protected from the weather.

According to a possible embodiment of the swimming pool lift, a portion of the casing is formed from a transparent material. Essential components of the swimming pool lift can be inspected through a viewing window without the need to remove the casing.

According to another possible embodiment, a wall part of the casing is formed as an openable flap. By opening the flap of the casing, components inside the casing can be accessed for repair and maintenance purposes without having to dismantle and remove the casing.

The casing may comprise several individual parts. These parts may be attached to a supporting rack of the swimming pool lift. According to a possible embodiment, a sealing element may be provided between the individual parts of the casing.

According to a possible embodiment, the casing may comprise a cover, a first sidewall and a second sidewall opposite to the first sidewall, and a front end face and a rear end face opposite to the front end face.

The casing may be formed with rounded transition sections between the cover and the first and second sidewall, and between the cover and the front end face, and between the cover and the rear end face, and between the rear end face and the first and second sidewall, and between the front end face and the first and second sidewall. As a result, the enclosure does not have any sharp corners that pool guests can injure themselves on.

According to a possible embodiment of the casing, the rear end face of the casing has a recess being configured for receiving a battery pack of the swimming pool lift. The battery of the swimming pool lift is therefore freely accessible without having to remove the casing to charge or replace the battery.

According to a possible embodiment of the casing, the front end face of the casing has an opening being formed such that a lifting arm of a linkage assembly of the swimming pool lift is moved out of the casing through the opening, when a seat of the swimming pool lift is lowered from an entry level position to a water level position.

According to another possible embodiment of the casing, the casing comprises at least a first part forming the rear end face and a first portion of the first and second sidewall of the casing. The casing further comprises at least a second part forming the front end face and a second portion of the first and second sidewall of the casing. The at least first part of the casing is configured to be fixed to a supporting rack of the swimming pool lift. The at least second part of the casing is configured to be fixed to a linkage assembly of the swimming pool lift so that the casing is opened, when the at least first and second part of the casing are moved apart.

It is to be understood that both the forgoing general description and the following detailed description present embodiments and are intended to provide an overview or a framework for understanding the nature and character of the disclosure. The accompanying drawings are included to provide further understanding, and are incorporated into, and constitute a part of, this specification. The drawings illustrate various embodiments and, together with the description, serve to explain the principles and operation of the disclosed concepts.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1A:
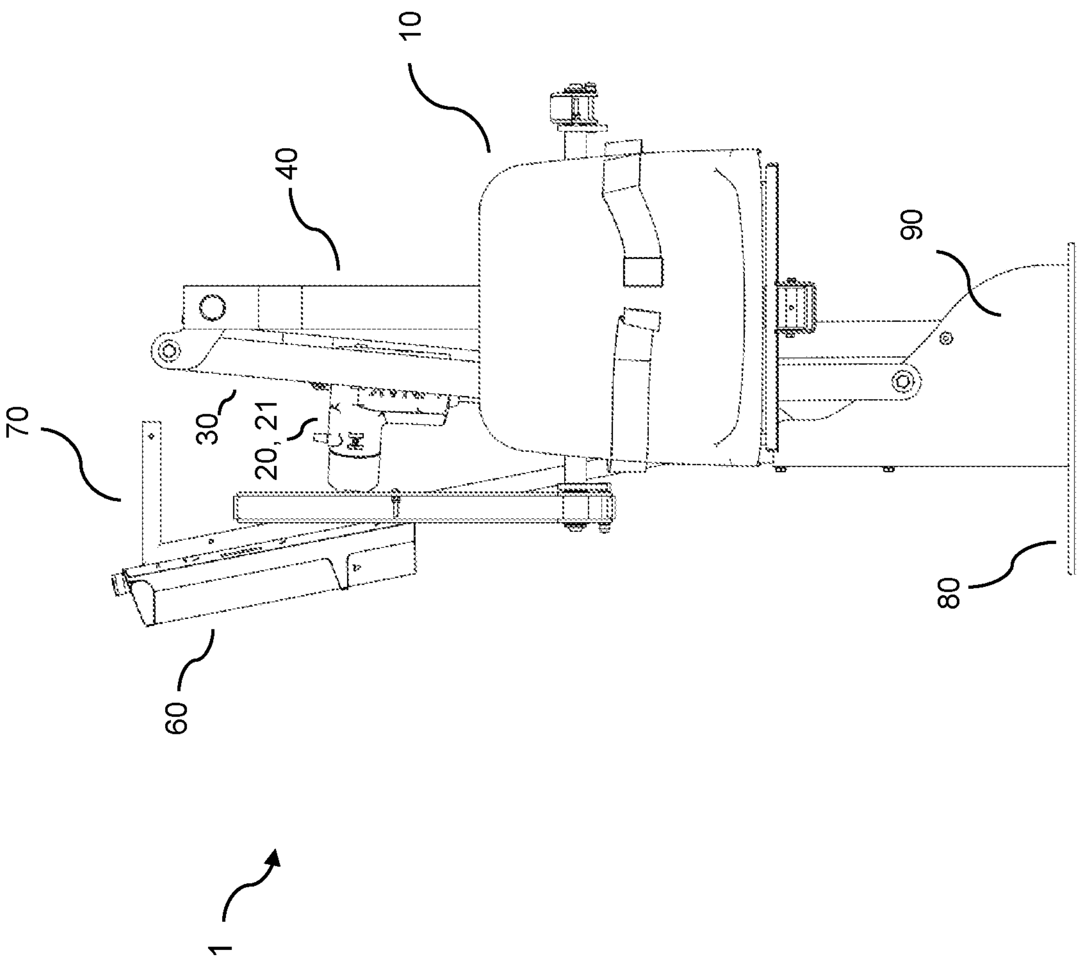
FIG. 1A shows a side view of a swimming pool lift with mechanical parts and electrical components.
Figure 1B:
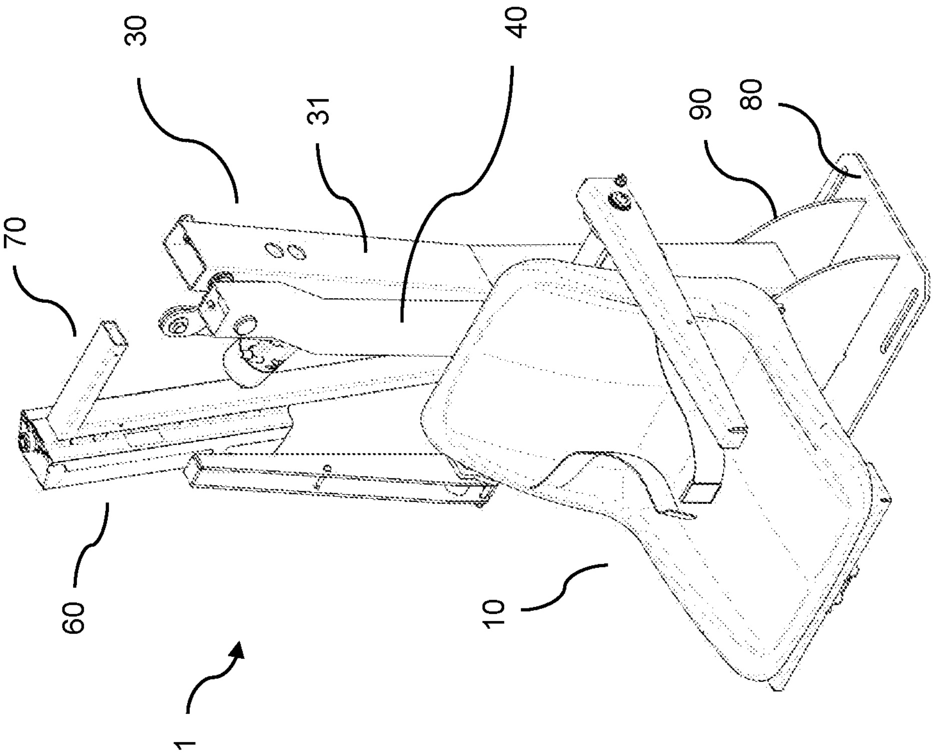
FIG. 1B shows a first perspective view of a swimming pool lift with mechanical parts and electrical components.
Figure 1C:
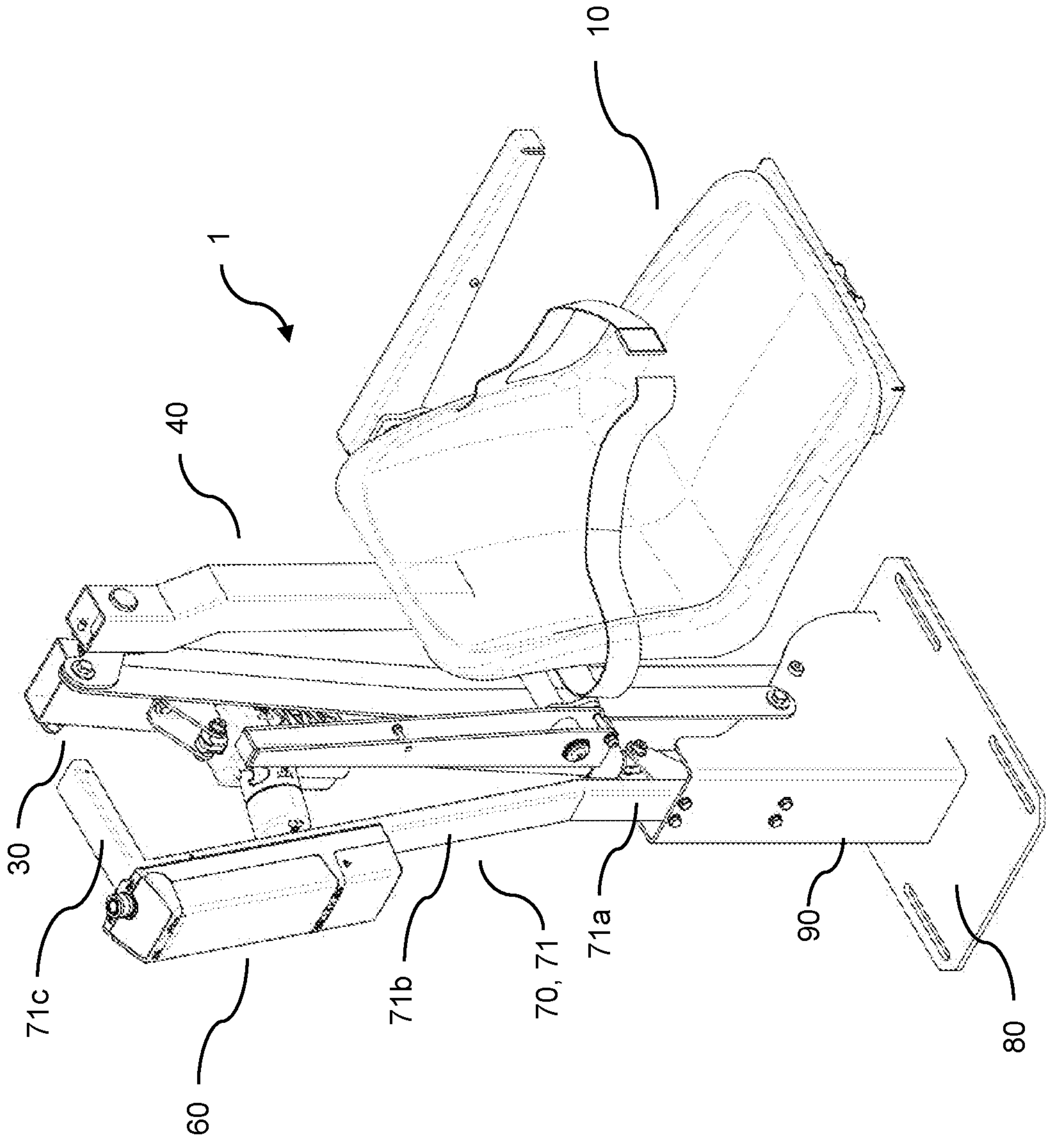
FIG. 1C shows a second perspective view of a swimming pool lift with mechanical parts and electrical components.

FIGS. 1A, 1B and 1C show an embodiment of a swimming pool lift 1 which is suitable for fixed installation on a pool edge of a swimming pool. FIG. 1A shows a side view of the swimming pool lift 1, and FIGS. 1B and 10 show a perspective view of the swimming pool lift 1.

The swimming pool lift 1 comprises a seat 10 for supporting a disabled person. The swimming pool lift 1 further comprises a linkage assembly 30 to move the seat 10 between an entry level position and a water level position. When the pool lift is in the entry level position shown in FIGS. 1A to 1C, the seat 10 is at a position outside the pool so that a disabled person can sit in the seat. In the water level position, the seat 10 is lowered to the surface of the water or even deeper into the pool so that the disabled person can leave the seat in the water.

The swimming pool lift comprises a driving device 20 to move the linkage assembly 30. According to a possible embodiment of the swimming pool lift, the driving device 20 may comprise an electric motor 21. According to another possible embodiment of the swimming pool lift, the driving device 20 may comprise components of a hydraulic system operated with oil pressure or water pressure.

The linkage assembly 30 is configured to be moved by the driving device 20 between a folded state, in which the arms of the linkage assembly are folded and the seat is in the entry level position, as shown in FIGS. 1A to 1C, and an unfolded state, in which the arms of the linkage assembly are unfolded and the seat is positioned at the water level position. The swimming pool lift 1 comprises a baseplate 80 for installing the swimming pool lift on a ground, for example at the edge of a pool. The baseplate can be fixed to the edge of the pool, for example by means of screws. The swimming pool lift 1 further comprises a supporting frame 90 for supporting the linkage assembly 30. The supporting frame 90 is attached to the baseplate 80. The linkage assembly 30 is mounted to the supporting frame 90.

Figure 2A:
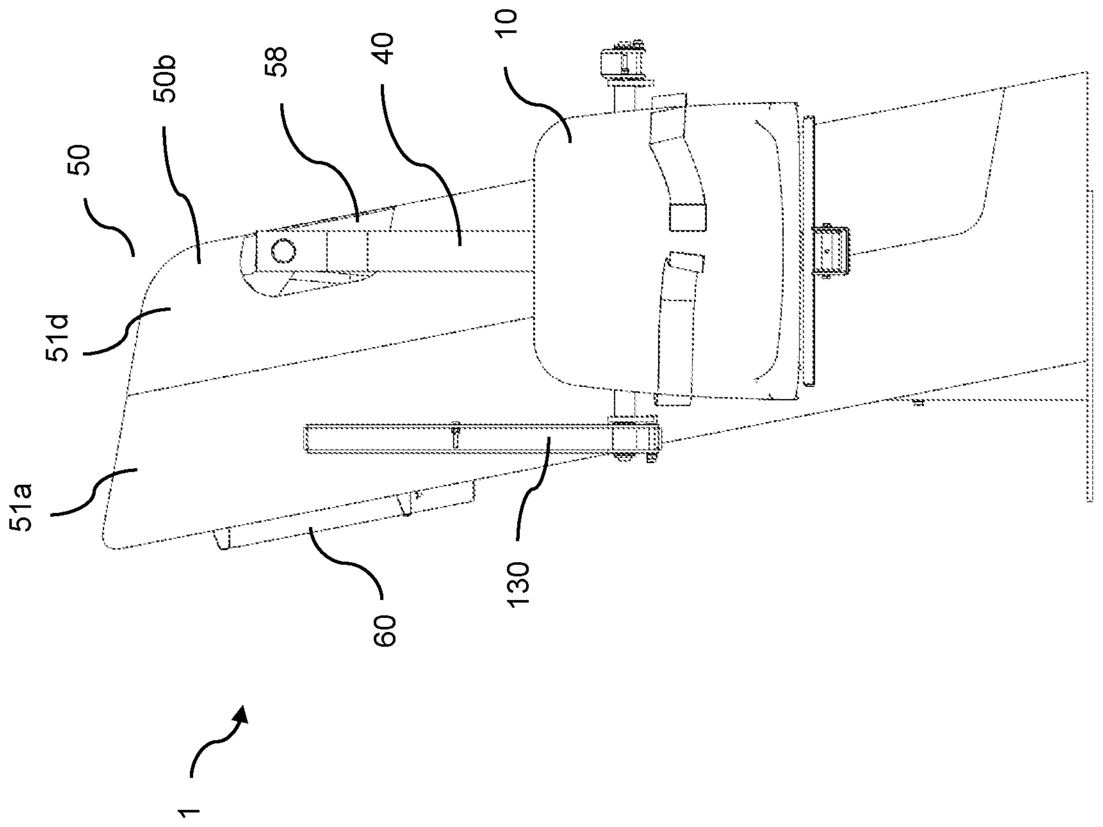
FIG. 2A shows a side view of a swimming pool lift with a casing for housing mechanical parts and electrical components of the swimming pool lift.
Figure 2B:
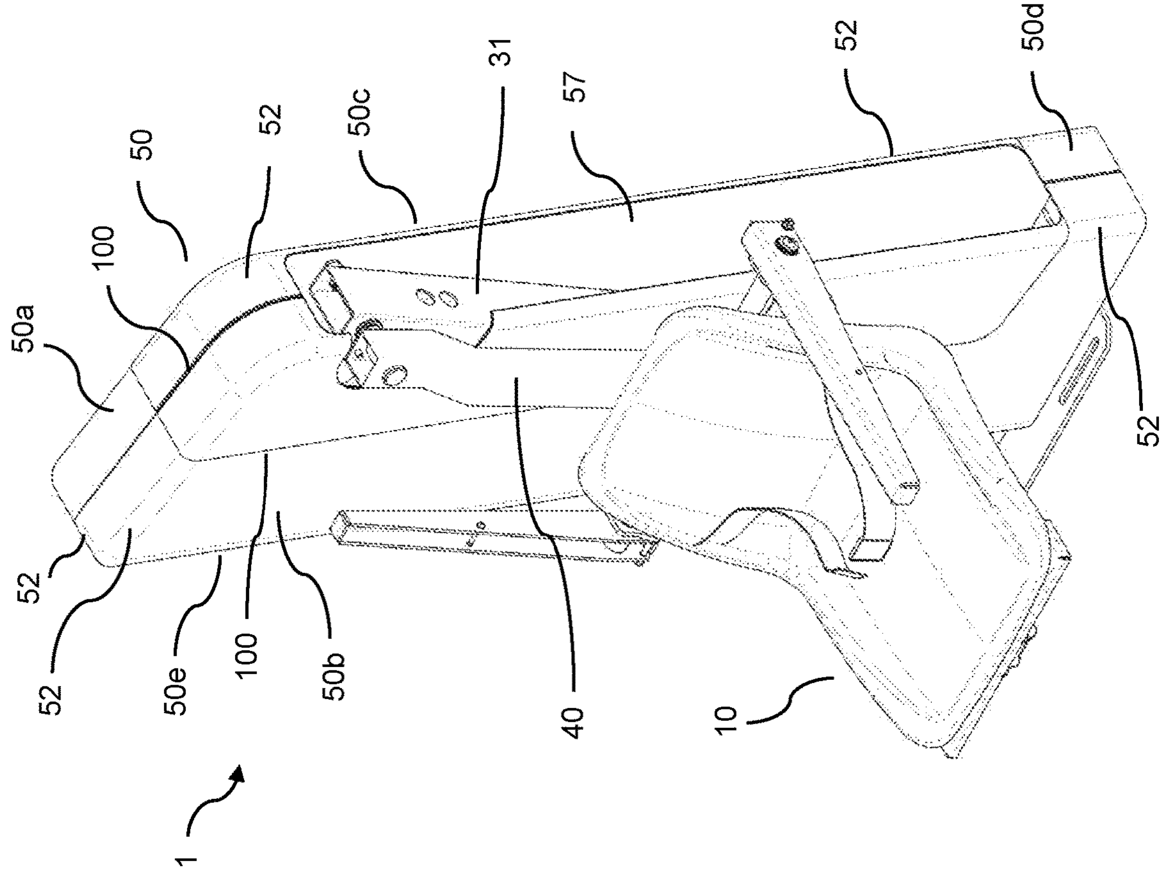
FIG. 2B shows a first perspective view of a swimming pool lift with a casing for housing mechanical parts and electrical components of the swimming pool lift.
Figure 2C:
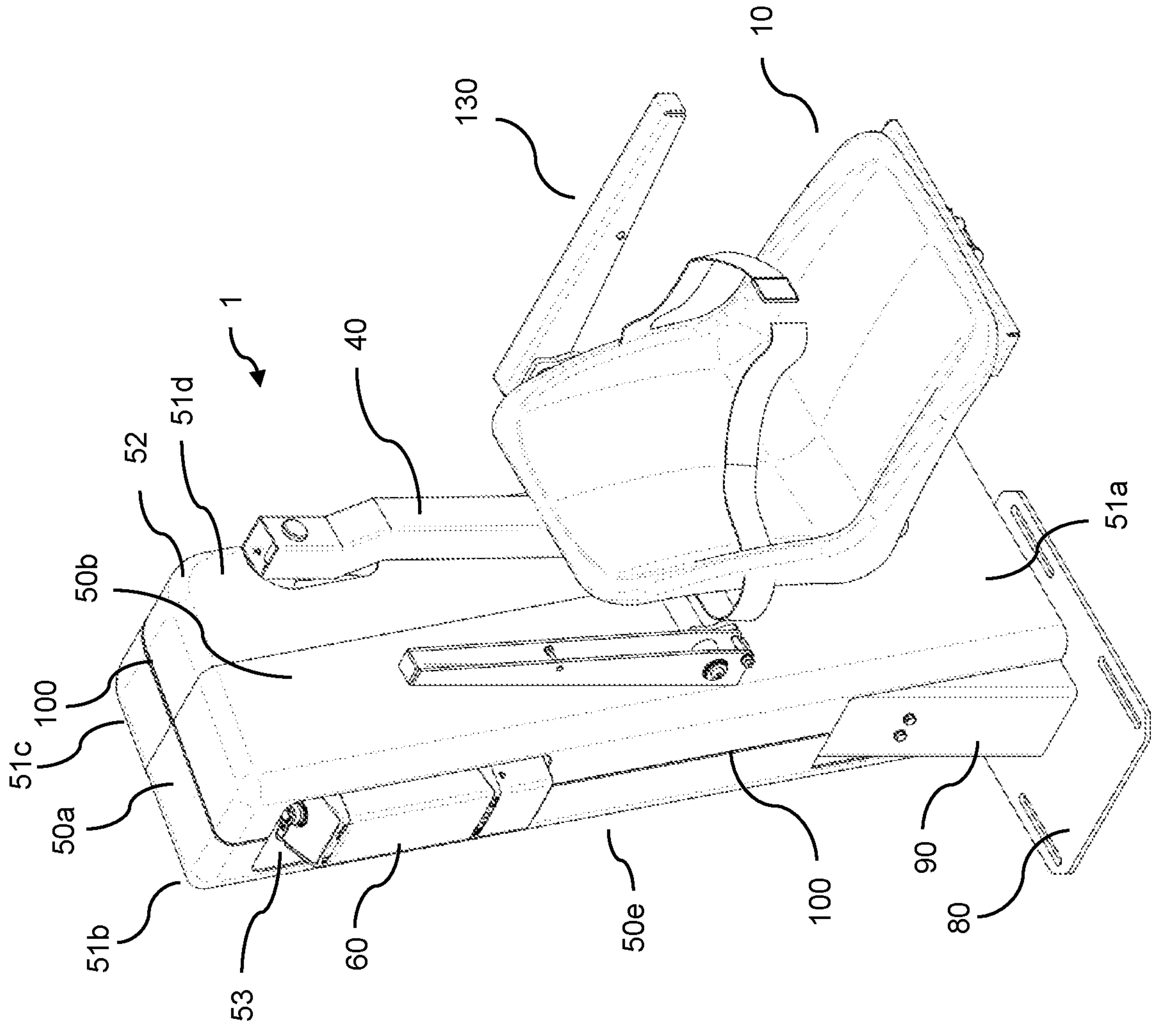
FIG. 2C shows a second embodiment of a swimming pool lift with a casing for housing mechanical parts and electrical components of the swimming pool lift.

According to the proposed embodiment of the swimming pool lift 1, the lift comprises a casing 50 to house mechanical parts of the linkage assembly 30, and components of the driving device, such as the electric motor 21 or a cylinder/piston of a hydraulic system operated with oil pressure or water pressure. The swimming pool lift 1 with the casing 50 is illustrated in a side view in FIG. 2A, and in respective perspective views in FIGS. 2B and 2C. The casing 50 of the swimming pool lift 1 is configured to house at least the linkage assembly 30 and the driving device 20, when the linkage assembly is in the folded state, i.e. the swimming pool lift is in the entry level position, as shown in FIGS. 2A to 2C.

The casing 50 protects the swimming pool lift from the weather and other environmental influences that are harmful to the lift. The casing 50 makes it possible that, in particular, the sensitive mechanical parts of the linkage assembly 30 and the sensitive components of the driving device 20 of the swimming pool lift are protected from bad weather, rain, sunlight, heat, cold and moisture.

Furthermore, the vulnerable mechanical parts and electrical components of the swimming pool lift are protected from salt and chloramine. Especially when the swimming pool lift is used in coastal regions of tropical countries, the salt present in the air quickly leads to corrosion of the mechanical parts and electrical components. By using a fixed casing, corrosion can be prevented and the life of the swimming pool lift can be extended.

Until now, mobile swimming pool lifts were mostly used outdoors, and had to be stored indoors when it rained or in winter, for example, and were also very expensive. If a permanently installed swimming pool lift was used outdoors, the mechanical parts and electrical components had to be covered with textile covers to protect them from the weather. The proposed swimming pool lift 1 with casing 50 makes it possible to install fixed swimming pool lifts at the edge of a pool instead of using the expensive and difficult-to-move mobile lifts, which no longer have to be covered with tarpaulins.

Furthermore, the casing 50 covers sharp edges and corners of the mechanical parts, so that the design of the swimming pool lift not only looks better than when the mechanical parts and electrical components are exposed and visible, but guests of the swimming pool are protected from injury by the sharp-edged corners of the lift.

The casing 50 of the swimming pool lift may comprise a cover 50*a*, a first sidewall 50*b*, a second sidewall 50*c* opposite to the first sidewall 50*b*, and a front end face 50*d* and a rear end face 50*e* opposite to the front end face 50*d*.

As illustrated, for example, in FIGS. 2B and 2C, according to a possible embodiment, the casing 50 may be formed with rounded transitions 52 between the cover 50*a* and the first and second sidewall 50*b*, 50*c*. Furthermore, rounded transition sections 52 may be provided between the cover 50*a* and the front end face 50*d*, and between the cover 50*a* and the rear end face 50*e* of the casing 50. Furthermore, rounded transitions 52 may be provided between the rear end face 50*e* and the first and second sidewall 50*b*, 50*c*, and may also be provided between the front end face 50*d* and the first and second sidewall 50*b*, 50*c*.

The rounded edges 52 not only make the lift and its housing 50 look visually appealing but also prevent the risk of injury. In addition, the casing 50 is easy to clean because water can easily run off the casing.

The casing 50 can be adapted to protect the mechanical parts and electrical components by the casing being shaped accordingly. In particular, as illustrated in FIGS. 2A to 2C, the sidewalls 50*b*, 50*c* of the casing 50 can be parallelogram-shaped. This means that the walls of the casing 50 are not perpendicular to the baseplate 80, but are inclined at an angle of less than or greater than 90° to the baseplate 80. For example, the front end face 50*d* is inclined at an angle greater than 90° to the baseplate 80 by the parallelogram-shaped sidewalls 50*b* and 50*c*. The rear end face 50*e* can be inclined at an angle of less than 90° to the baseplate 80 by the parallelogram-shaped sidewalls 50*b* and 50*c*. This causes the casing 50 to stand slanted, i.e. at an angle different from 90° on the baseplate 80.

Furthermore, the swimming pool lift 1 will stand out because of its design and attract the attention of the visitors of the swimming pool. This can be used to advantage. For example, the large sidewalls 50*b* and 50*c* can be used as advertising space or for information purposes. The surface of the sidewalls 50*b* and 50*c* is flat so that advertising as well as information posters can be stuck on the sidewalls.

According to another possible embodiment, the sidewalls 50*b* and 50*c* of the swimming pool lift 1 can be equipped with a holding device for inserting or attaching posters.

According to another possible embodiment, an electronic display, in particular a waterproof electronic display, or a holding device for holding the electronic display, can be arranged on the sidewalls 50*b* and 50*c* of the swimming pool lift.

Figure 3:
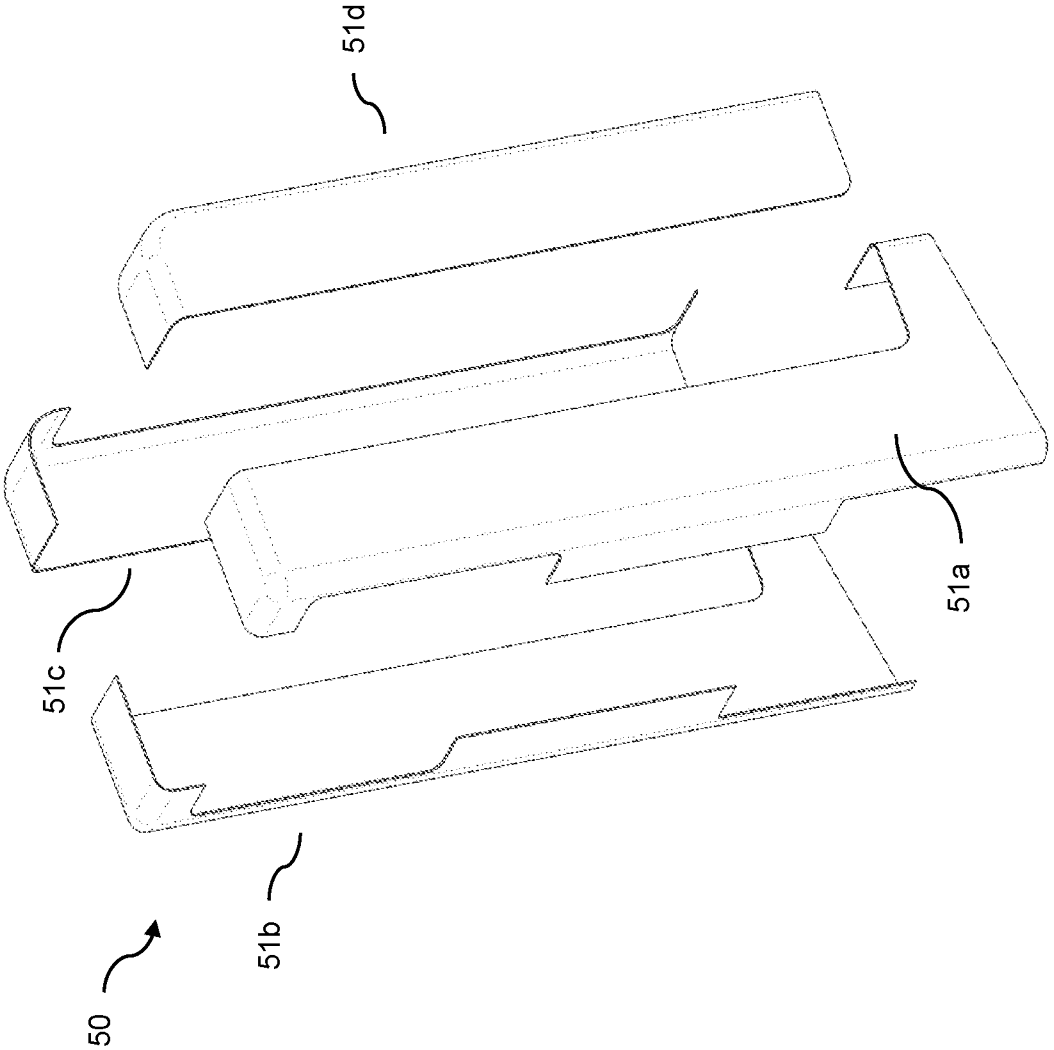
FIG. 3 shows an embodiment of a casing for a swimming pool lift with individual parts.

According to a possible embodiment of the swimming pool lift, the casing 50 may comprise several individual parts. Referring to FIG. 3, for example, the casing 50 may comprise four individual parts 51*a*, 51*b*, 51*c* and 51*d*.

A first individual part 51*a* and a second individual part 51*b* may form a respective portion of the rear end face 50*e* and a respective portion of the cover 50*a* of the casing 50. Furthermore, the first individual part 51*a* may form a portion of the sidewall 50*b*. The second individual part 51*b* may form a portion of the sidewall 50*c*.

The casing 50 may comprise a third individual part 51*c* and a fourth individual part 51*d* forming a respective portion of the cover 50*a* of the casing 50. Furthermore, the third individual part 51*c* forms a portion of the sidewall 50*c*. The fourth individual part 51*d* forms a portion of the sidewall 50*b*.

Figure 4A:
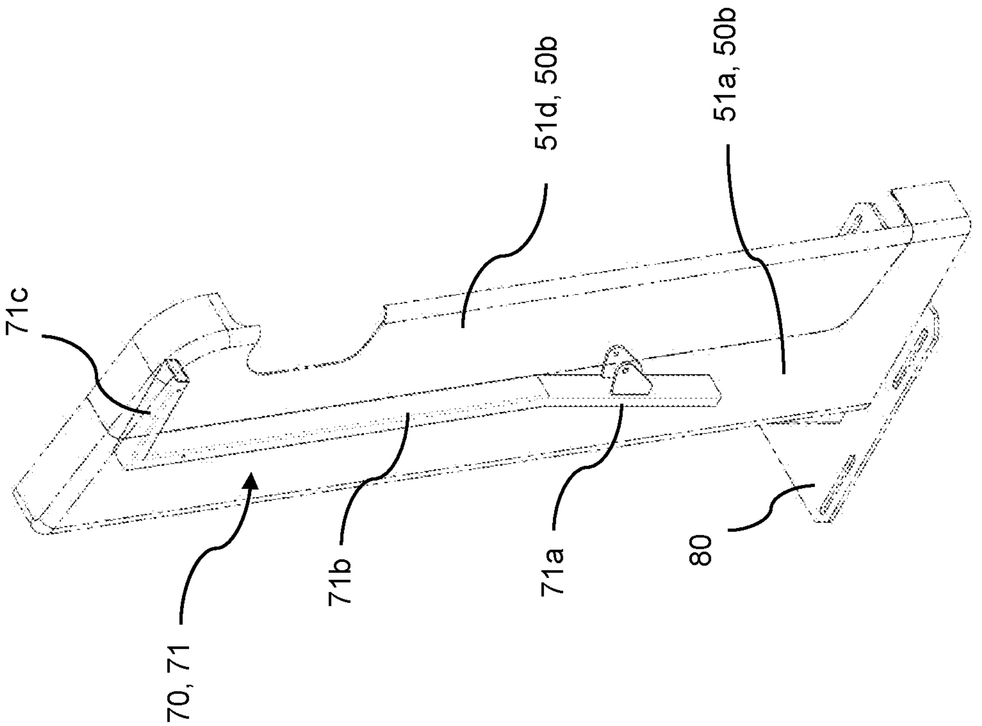
FIG. 4A shows a perspective view of a portion of a casing mounted to a supporting rack for a swimming pool lift.
Figure 4B:
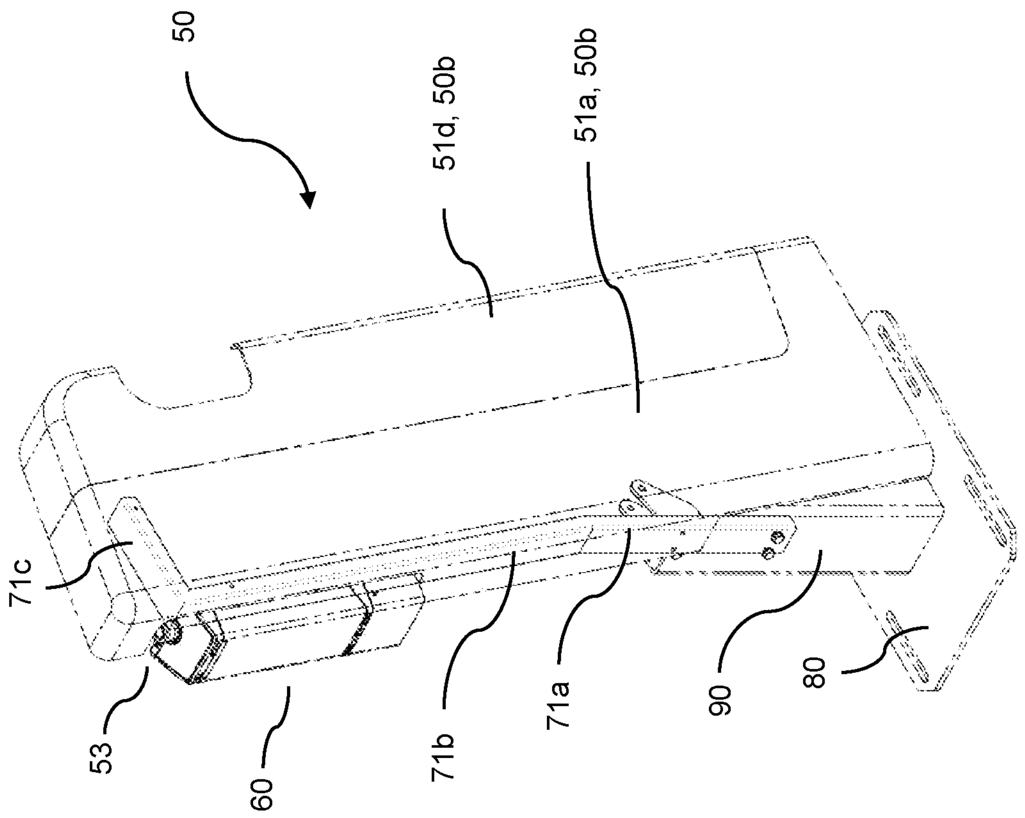
FIG. 4B shows a perspective view of a casing mounted to a supporting rack of a swimming pool lift.

The swimming pool lift 1 may comprise a supporting rack 70 which is best shown in FIGS. 1A to 10 as well as in FIGS. 4A and 4B. The supporting rack 70 may be mounted to the supporting frame 90. The casing 50 is mounted on the supporting rack 70.

Referring to FIG. 4A, the supporting rack 70 comprises a support bar 71 having a first portion 71*a*, a second portion 71*b* and a third portion 71*c*. The first portion 71*a* of the support bar 71 is fixed to the supporting frame 90, as illustrated in FIG. 4B. The second portion 71*b* of the support bar 71 extends from an end of the first portion 71*a* of the support bar 71 angled to the first portion 71*a* of the support bar 70 towards the cover 50*a* of the casing 50. The third portion 71*c* of the support bar 71 extends from an end of the second portion 71*b* of the support bar 71 angled to the second portion 71*b* of the support bar 71 towards the front end face 50*d* of the casing 50.

The first individual part 51*a* and the second individual part 51*b* of the casing 50 may be fixed to the first portion 71*a* of the support bar 70, for example by a screw connection. The third individual part 51*c* and the fourth individual part 51*d* of the casing 50 may be fixed to the third portion 71*c* of the support bar 71, for example by a screw connection.

The supporting rack 70 can be made of metal to which the casing 50 or the individual parts 51*a*, 51*b*, 51*c* and 51*d* of the casing 50 are attached. The casing 50 can be made of a plastic material and is thus, on the one hand, light and, on the other hand, stable due to the supporting rack 70 to which the casing 50 or its individual parts 51*a*, . . . , 51*d* are attached.

According to a possible embodiment of the swimming pool lift 1, a sealing element 100, for example a rubber seal, may be provided between the individual parts 51_a_, . . . , 51_d_ of the casing 50. This prevents particles such as sand or dust, but also water, from entering the interior of the casing 50.

The driving device 20, for example an electric motor, of the swimming pool lift 1 is power-supplied by a battery pack 60. As shown in FIG. 4B, the battery pack 60 may be mounted to the second portion 71_b_ of the support bar 71.

Referring to FIG. 2C and FIG. 4B, the rear end face 50_e_ of the casing 50 may have a recess 53. The linkage assembly 30 is arranged inside the casing 50 so that the battery pack 60 is located in the recess 53 of the rear end face 50_e_, when the linkage assembly 30 is in the folded state. This makes the battery pack 60 easily accessible for maintenance or charging.

To enable a fast disassembly of the casing 50, the individual parts of the casing 50 can be fastened to the supporting rack 70 by quick-release fasteners or by screws. For maintenance, it is thus not necessary to remove the entire casing 50, but only some of the individual parts of the casing. If, for example, an actuator is to be serviced, only the rear individual part of the casing 50 needs to be dismounted.

Figure 5B:
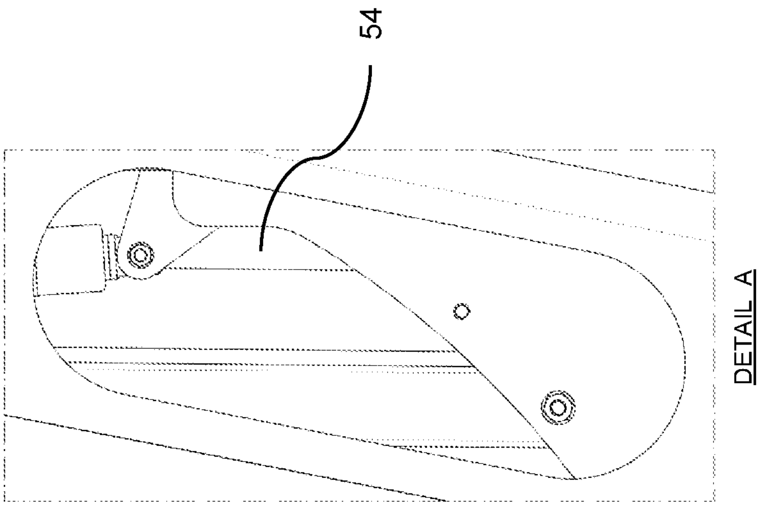
FIG. 5B is a detail of area A in FIG. 5A.
Figure 5A:
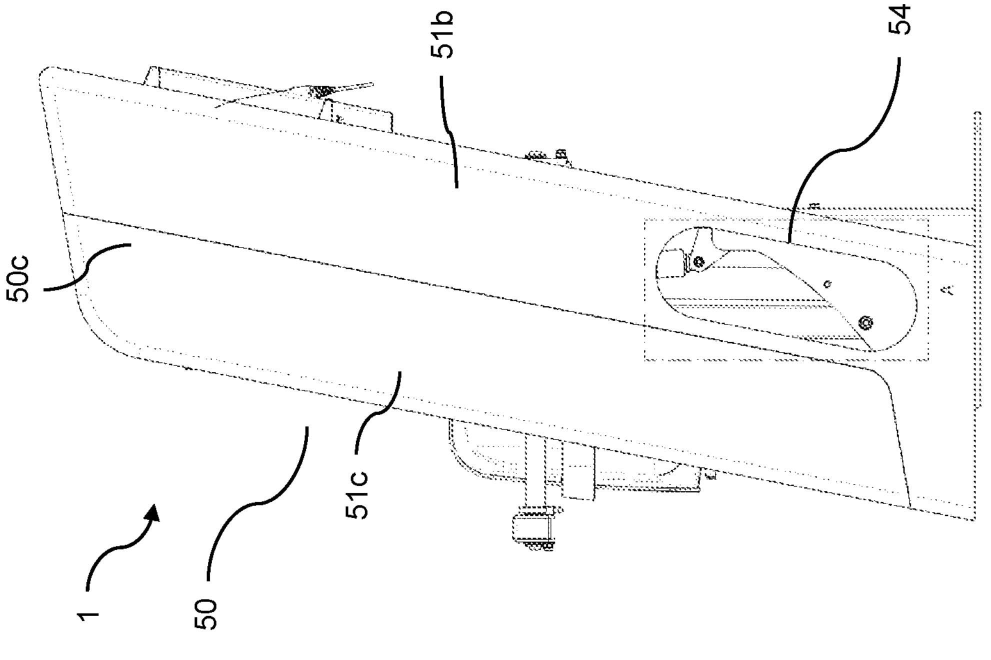
FIG. 5A shows an embodiment of a swimming pool lift with a casing having an opening covered with a transparent material.

Referring to FIG. 5A, according to a possible embodiment of the swimming pool lift 1, a portion of the casing 50, i.e. one of the individual parts, for example individual part 51_b_ of the sidewall 50_c_, may be formed from a transparent material 54. This allows at least a visual inspection of mechanical parts or electrical components of the swimming pool lift 1.

Figure 6:
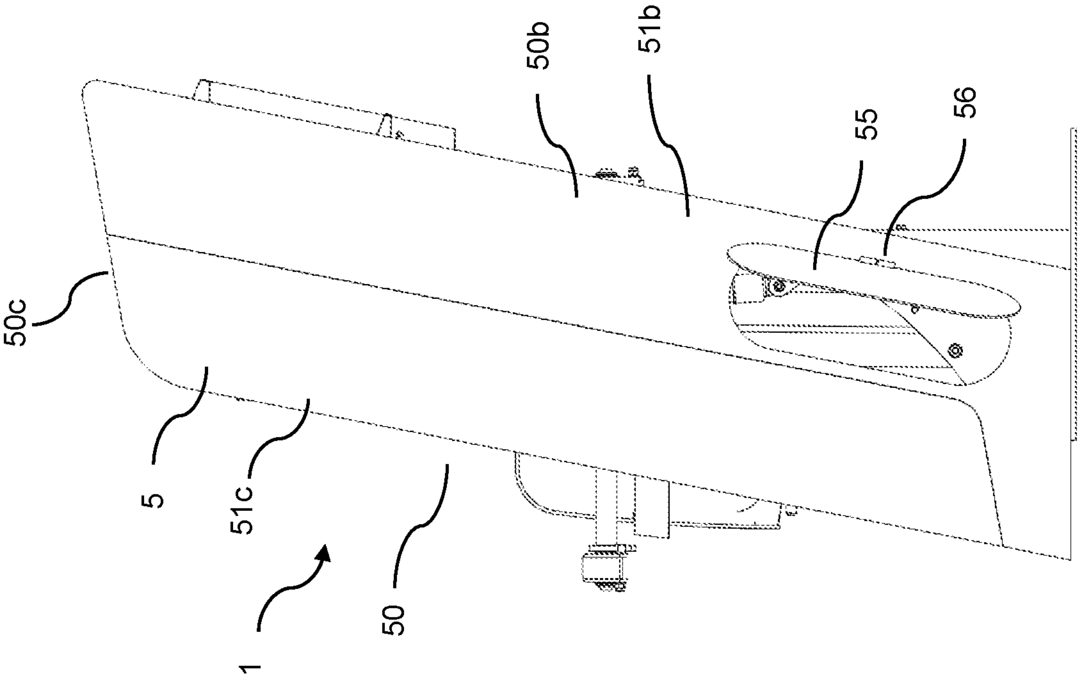
FIG. 6 shows an embodiment of a swimming pool lift with a casing having an openable flap used for maintenance purposes of components of a swimming pool lift.

According to another possible embodiment of the swimming pool lift 1 shown in FIG. 6, a wall part of the casing 50, for example a part of the sidewall 50_b_, may be formed as an openable flap 55 which can be opened by a hinge 56 attached to the sidewall 50_b_. By opening the flap 55, mechanical parts or electrical components of the swimming pool lift 1 can be serviced without removing the entire casing 50.

Referring to the embodiment of the swimming pool lift shown in FIGS. 2A to 2C, the swimming pool lift 1 comprises a supporting arm 40 to support the seat 10, the linkage assembly 30 comprises at least a lifting arm 31. The supporting arm 40 is pivotably coupled to the lifting arm 31 so that the supporting arm 40 is in a nearly vertical position during movement of the lifting arm 31 between the folded and unfolded state of the linkage assembly 30.

As illustrated, for example in FIG. 2B, the front end face 50_d_ of the casing 50 has an opening 57. The linkage assembly 30 is arranged inside the casing 50 so that at least a portion of the lifting arm 31 at which the supporting arm 40 is pivotably mounted is moved outside the casing 50, when the linkage assembly 30 is moved from the folded state to the unfolded state, and thus the seat 10 is moved from the entry level position to the water level position. The mechanical parts of the linkage assembly 30 of the swimming pool lift 1 are thus only extended from the casing 50 to lower the seat 10 to the water level position. Of the mechanical parts, only the supporting arm 40 protrudes from a recess 58 of the sidewall 50_b_ out of the casing, as illustrated in FIG. 2A. Ultimately, only the supporting arm 40, the seat 10 and the armrests 130 protrude out of the casing 50.

Figure 7A:
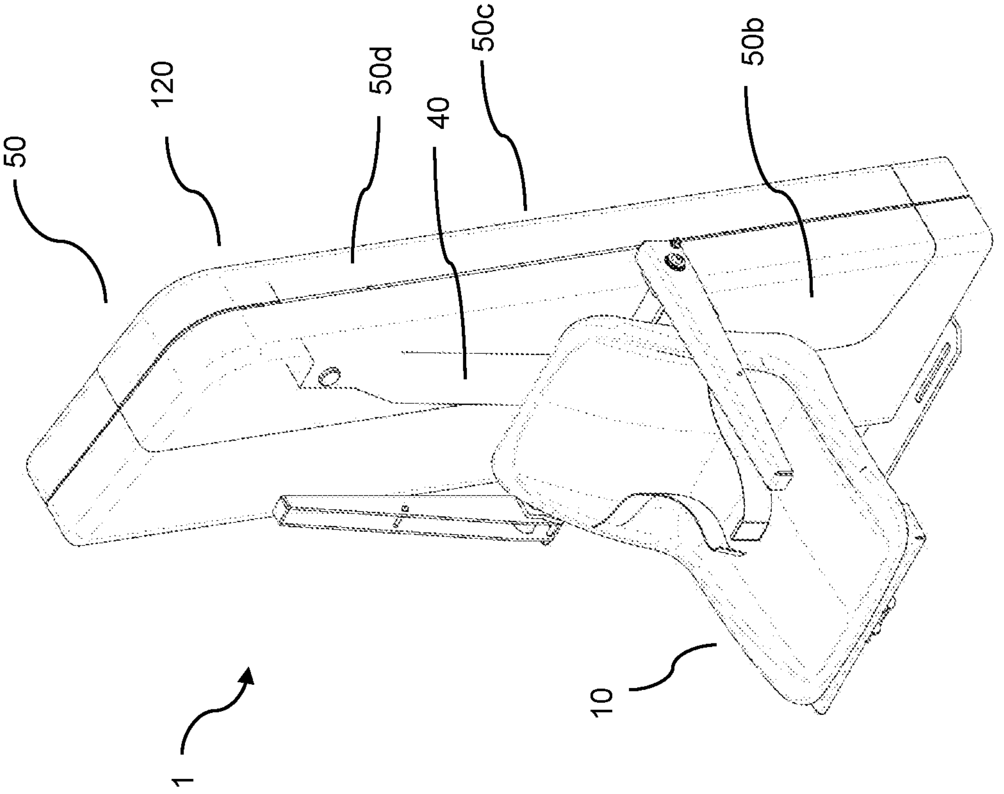
FIG. 7A shows a first perspective view of an embodiment of a swimming pool lift having an openable casing construction in an entry level position of the swimming pool lift.
Figure 7B:
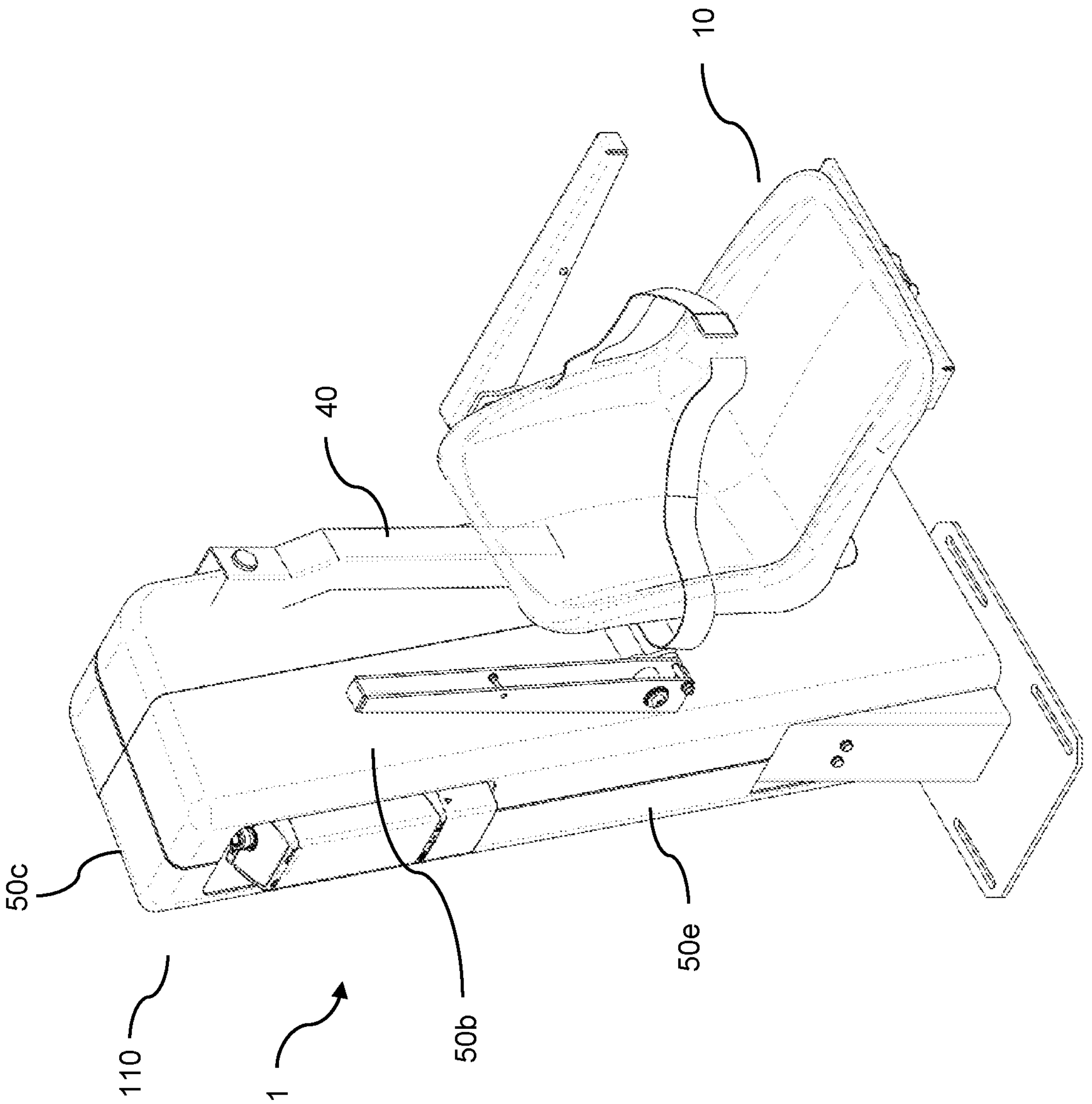
FIG. 7B shows a second perspective view of an embodiment of a swimming pool lift having an openable casing construction in an entry level position of the swimming pool lift.
Figure 8A:
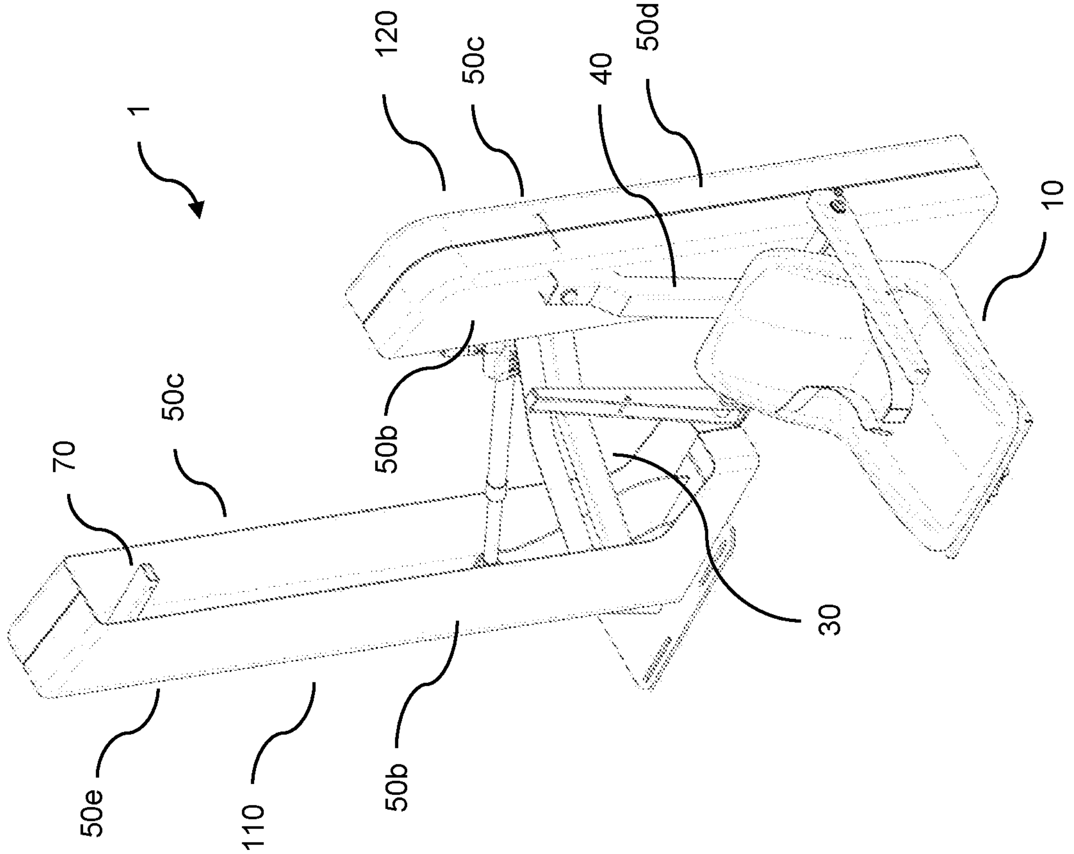
FIG. 8A shows a first perspective view of a swimming pool lift having an openable casing in an opened configuration in a water level position of the swimming pool lift.
Figure 8B:
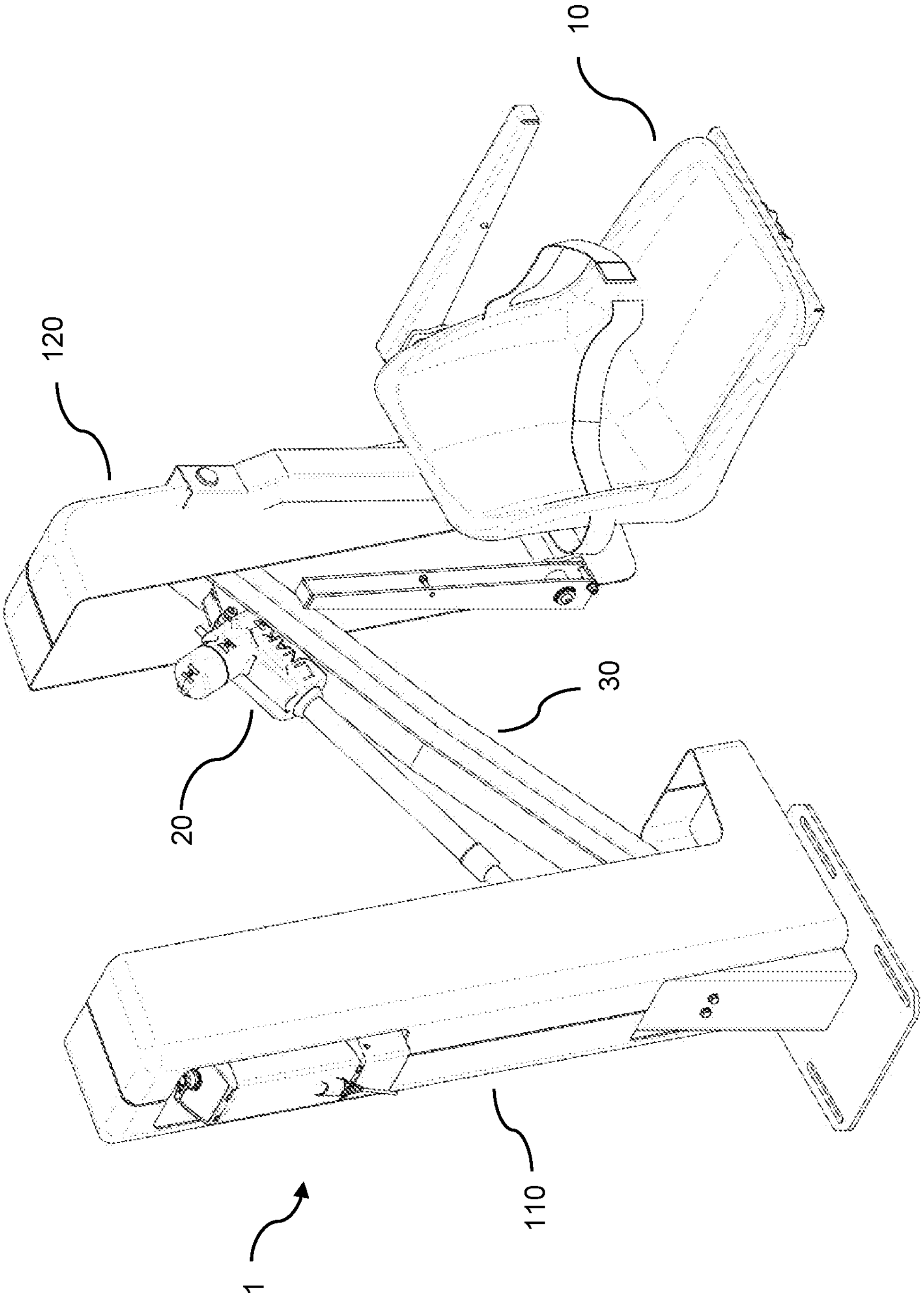
FIG. 8B shows a second perspective view of a swimming pool lift having an openable casing in an opened configuration in a water level position of the swimming pool lift.

Another embodiment of the swimming pool lift 1 is illustrated in FIGS. 7A, 7B, 8A and 8B. FIGS. 7A and 7B show this other embodiment of the swimming pool lift 1 in the entry level position with the linkage assembly in the folded state, and FIGS. 8A and 8B show the embodiment of the swimming pool lift 1 in the water level position with the linkage assembly 30 in the unfolded state.

According to the embodiment of the swimming pool lift 1 shown in FIGS. 7A to 8A, the casing 50 is configured to be opened when the linkage assembly 30 is moved from the folded state to the unfolded state and thus the seat 10 is moved from the entry level position to the water level position.

The casing 50 comprises at least a first part 110 forming the rear end face 50_e_ and a first portion of the first and second sidewall 50_b_, 50_c_ of the casing 50. The first part 110 of the casing 50 may be formed from individual parts 51_a_ and 51_b_ of the casing. The casing 50 further comprises at least a second part 120 forming the front end face 50_d_ and a second portion of the first and second sidewall 50_b_ and 50_c_ of the casing 50. The second part 120 of the casing may be formed from individual parts 51_c_ and 51_d_ of the casing. The at least first part 110 of the casing 50 is fixed to the supporting rack 70. The at least second part 120 of the casing 50 is fixed to the linkage assembly 30 so that the casing 50 is opened by moving the at least first and second part 110 and 120 of the casing 50 apart, when the linkage assembly 30 is moved from the folded state to the unfolded state, as illustrated in FIGS. 8A and 8B.

The embodiments of the swimming pool lift with weather protection for permanent installation at an edge of a swimming pool and the casing for housing the swimming pool lift disclosed herein have been discussed for the purpose of familiarizing the reader with novel aspects of the swimming pool lift and the casing for housing the swimming pool lift. Although preferred embodiments have been shown and described, many changes, modifications, equivalents and substitutions of the disclosed concepts may be made by one having skill in the art without unnecessarily departing from the scope of the claims.

In particular, the design of the swimming pool lift and the casing is not limited to the disclosed embodiments, and gives examples of many alternatives as possible for the features included in the embodiments discussed. However, it is intended that any modifications, equivalents and substitutions of the disclosed concepts be included within the scope of the claims which are appended hereto.

Features recited in separate dependent claims may be advantageously combined.

Furthermore, as used herein, the term "comprising" does not exclude other elements. In addition, as used herein, the article "a" is intended to include one or more than one component or element, and is not limited to be construed as meaning only one.

Although only a few embodiments of the present invention have been shown and described, it is to be understood that many changes and modifications may be made thereunto without departing from the spirit and scope of the invention.

LIST OF REFERENCE SIGNS

1 swimming pool lift
10 seat
20 driving device
21 electric motor
30 linkage assembly
31 lifting arm
40 supporting arm
50 casing
50_a_ cover
50_b_, 50_c_ sidewall
50_d_ front end face
50_e_ rear end face

51a, . . . , 51d individual parts of casing
52 transition sections
53 recess
54 transparent material
55 flap
56 hinge
57 opening
58 recess
60 battery pack
70 supporting rack
71 support bar
71a, 71b, 71c portion of the support bar
80 baseplate
90 supporting frame
100 sealing element
110 first part of the casing
120 second part of the casing
130 armrest

What is claimed is:

1. A swimming pool lift with weather protection for permanent installation at an edge of a swimming pool, comprising:

a seat for supporting a disabled person;
a linkage assembly to move the seat between an entry level position and a water level position;
a driving device to move the linkage assembly;
a battery pack for supplying power to the driving device; and
a casing;
wherein the linkage assembly is configured to be moved by the driving device between a folded state, in which the seat is positioned at the entry level position, and an unfolded state, in which the seat is positioned at the water level position;
wherein the casing is configured to house the linkage assembly and the driving device, when the linkage assembly is in the folded state;
wherein the casing comprises a rear end face having a recess being configured for receiving the battery pack; and
wherein the linkage assembly is arranged inside the casing so that the battery pack is located in the recess of the rear end face, when the linkage assembly is in the folded state.

2. The swimming pool lift as claimed in claim 1, wherein the casing comprises a cover, a first sidewall and a second sidewall opposite to the first sidewall, and a front end face and the rear end face opposite to the front end face.

3. The swimming pool lift as claimed in claim 2, wherein the casing is formed with rounded transition sections between the cover and the first and second sidewall, and between the cover and the front and the rear end face, and between the rear end face and the first and second sidewall, and between the front end face and the first and second sidewall.

4. The swimming pool lift as claimed in claim 1, wherein a portion of the casing is formed from a transparent material.

5. The swimming pool lift as claimed in claim 1, wherein a wall part of the casing is formed as an openable flap.

6. The swimming pool lift as claimed in claim 1, comprising:

a supporting rack;
wherein the casing is mounted on the supporting rack.

7. The swimming pool lift as claimed in claim 6, comprising:

a baseplate for installing the swimming pool lift on a ground; and
a supporting frame for supporting the linkage assembly and the supporting rack;
wherein the supporting frame is attached to the baseplate; and
wherein the linkage assembly and the supporting rack are mounted to the supporting frame.

8. The swimming pool lift as claimed in claim 6, wherein the supporting rack comprises a support bar having a first portion, a second portion and a third portion;
wherein the first portion of the support bar is fixed to the supporting frame;
wherein the second portion of the support bar extends from an end of the first portion of the support bar angled to the first portion of the support bar towards the cover of the casing; and
wherein the third portion of the support bar extends from an end of the second portion of the support bar angled to the second portion of the support bar towards the front end face of the casing.

9. The swimming pool lift of claim 8, wherein the battery pack is mounted to the second portion of the support bar.

10. The swimming pool lift as claimed in claim 1, wherein the casing comprises several individual parts which are attached to the supporting rack.

11. The swimming pool lift as claimed in claim 10, wherein a sealing element is provided between the individual parts of the casing.

12. The swimming pool lift as claimed in claim 1, comprising:

a supporting arm to support the seat;
wherein the linkage assembly comprises at least a lifting arm;
wherein the supporting arm is pivotably coupled to the lifting arm;
wherein the front end face of the casing has an opening; and
wherein the linkage assembly is arranged inside the casing so that at least a portion of the lifting arm at which the supporting arm is pivotably mounted is moved outside the casing, when the linkage assembly is moved from the folded state to the unfolded state.

13. The swimming pool lift as claimed in claim 1, wherein the casing is configured to be opened, when the linkage assembly is moved from the folded state to the unfolded state.

14. The swimming pool lift as claimed in claim 13, wherein the casing comprises at least a first part forming the rear end face and a first portion of the first and second sidewall of the casing;
wherein the casing comprises at least a second part forming the front end face and a second portion of the first and second sidewall of the casing;
wherein at least the first part of the casing is fixed to the supporting rack; and
wherein at least the second part of the casing is fixed to the linkage assembly so that the casing is opened, when at least the first part and the second part of the casing are moved apart.

* * * * *